United States Patent

[11] 3,581,900

[72] Inventor George B. Clark
 Waukesha, Wis.
[21] Appl. No. 788,871
[22] Filed Jan. 3, 1969
[45] Patented June 1, 1971
[73] Assignee Aqua-Chem, Inc.
 Continuation-in-part of application Ser. No. 724,663, Mar. 20, 1968, now abandoned,
 Continuation-in-part of application Ser. No. 678,051, Oct. 25, 1967, now abandoned.

[54] REVERSE OSMOSIS LIQUID PURIFICATION
 28 Claims, 10 Drawing Figs.
[52] U.S. Cl. .................................................. 210/321,
 117/95, 210/336, 210/433, 210/490, 210/500
[51] Int. Cl. .................................................. B01d 31/00,
 B01d 13/00
[50] Field of Search .......................................... 117/95;
 210/23, 22, 500, 321, 489, 490, 491, 497, 433,
 323, 336, 450, 455; 264/41, 49

[56] References Cited
 UNITED STATES PATENTS
1,810,965 6/1931 Hopkins ....................... 210/323
2,197,805 4/1940 Levett ........................... 210/500X
3,341,024 9/1967 Lowe et al. .................... 210/490
3,401,798 9/1968 Hyrop ........................... 210/321
3,457,170 7/1969 Havens ......................... 210/490X
3,445,321 5/1969 Groves ......................... 161/92

FOREIGN PATENTS
8,545 4/1910 Great Britain ................ 210/455
295,120 4/1965 Netherlands ................. 210/321
548,246 11/1957 Canada ....................... 210/321

OTHER REFERENCES
Loeb, " A Composite Tubular Assembly For Reverse Osmosis Desalination," from Desalination, Vol. 1 No. 1, April, 1966, 99 pages, pp. 35— 48 relied on, published by Elsener Publishing Co., Amsterdam.

Primary Examiner—Frank A. Spear, Jr.
Attorneys—Fred Wiviott and Ralph G. Hohenfeldt ABSTRACT: An expendable tubular membrane structure for use in reverse osmosis liquid purification equipment including a rigid supporting tube for supporting the membrane structure, the expendable membrane comprising a porous, semirigid, thin-walled tube adapted to be received within the supporting tube, and which may have an outer, grooved surface. A liquid impervious plastic material is provided at both ends of the porous tube, and a film of semipermeable membrane material is bonded to the interior wall of the porous tube; a method of making the expendable membrane; and an apparatus utilizing the same.

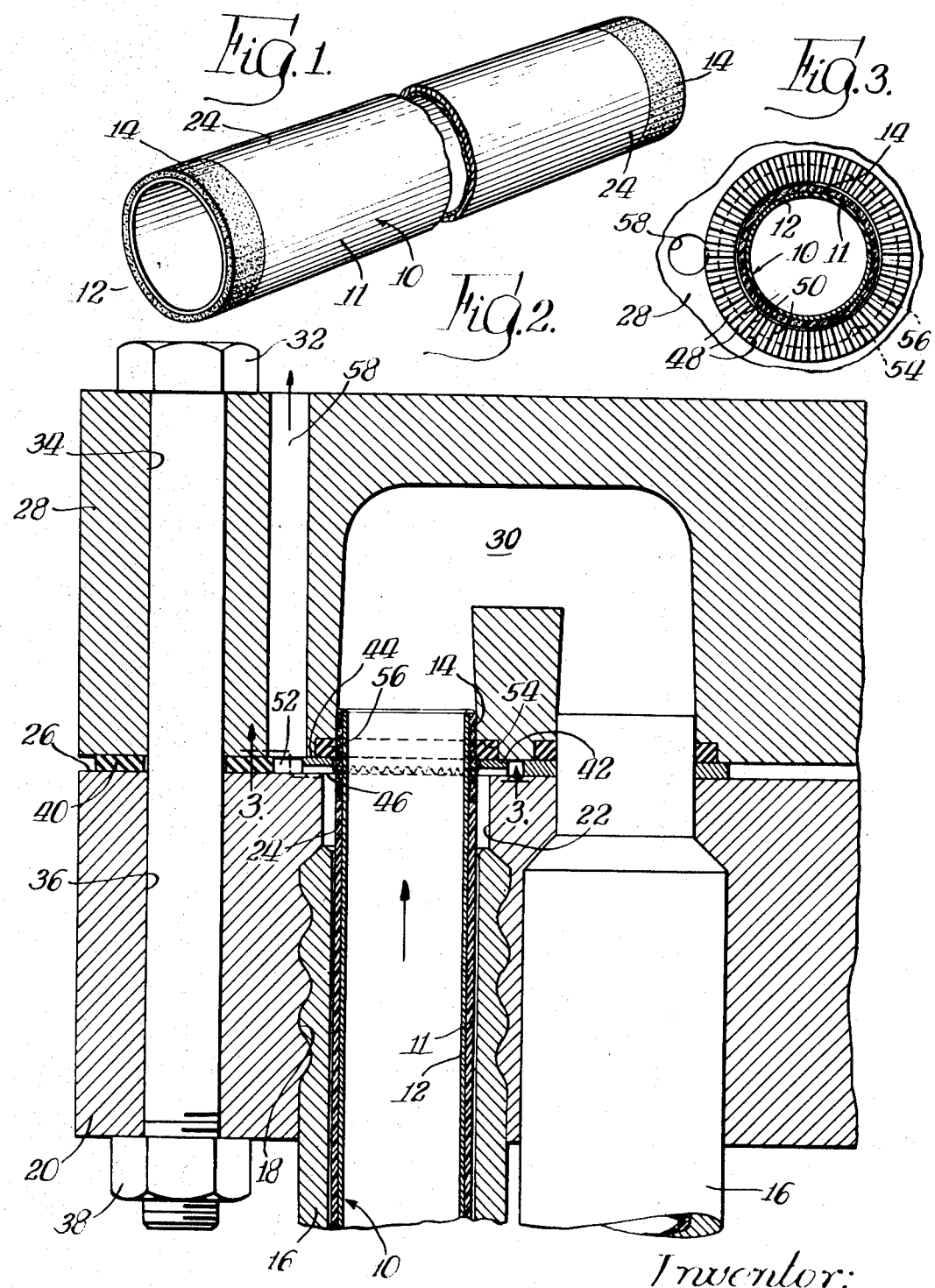

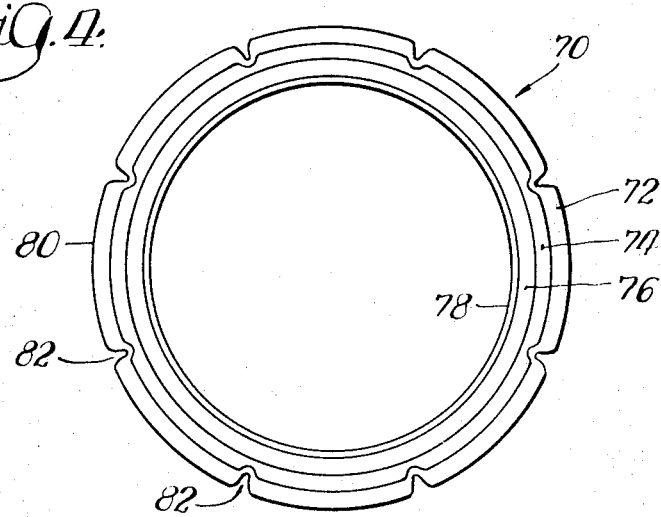
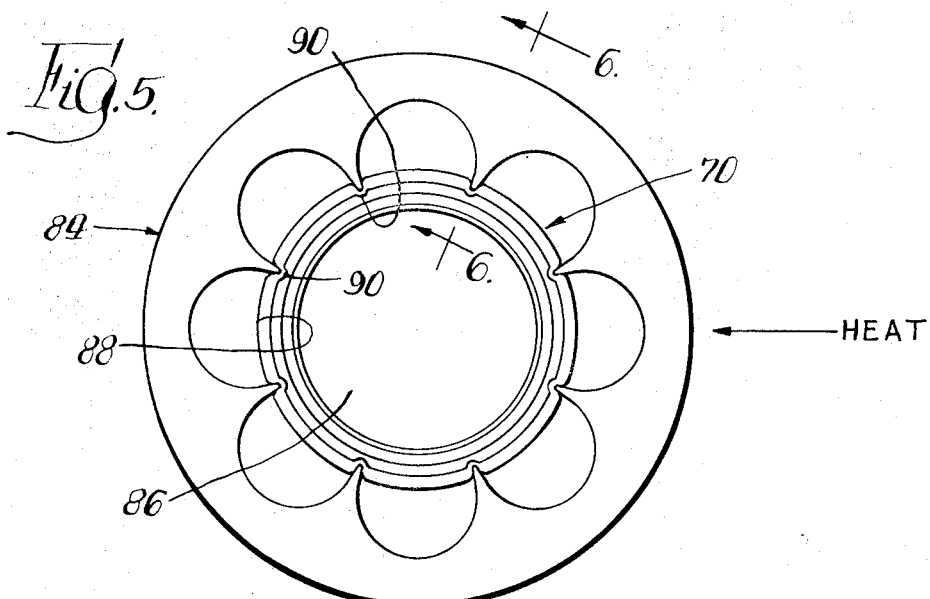
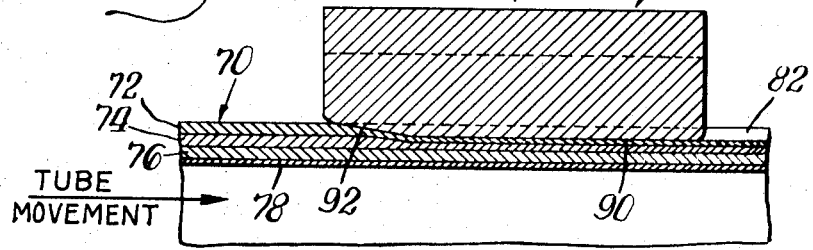

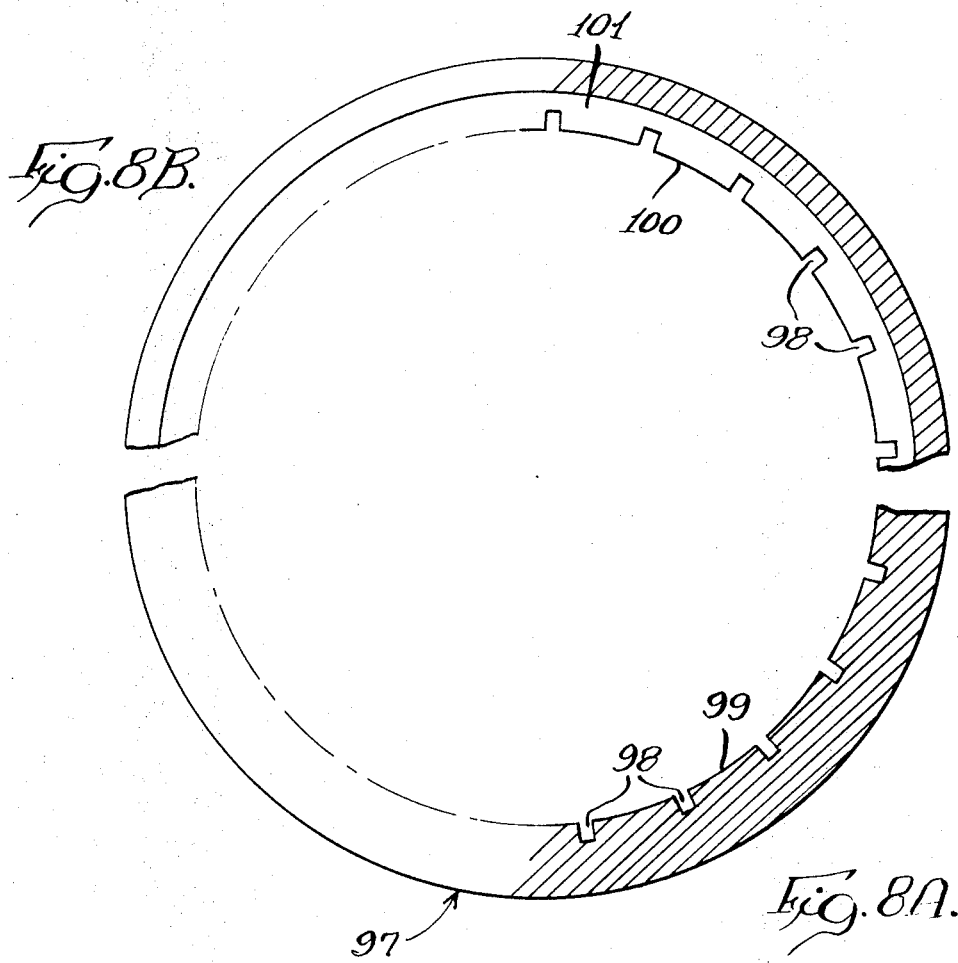
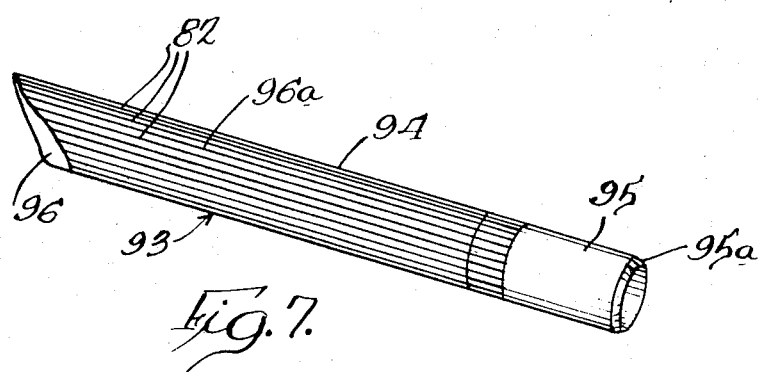

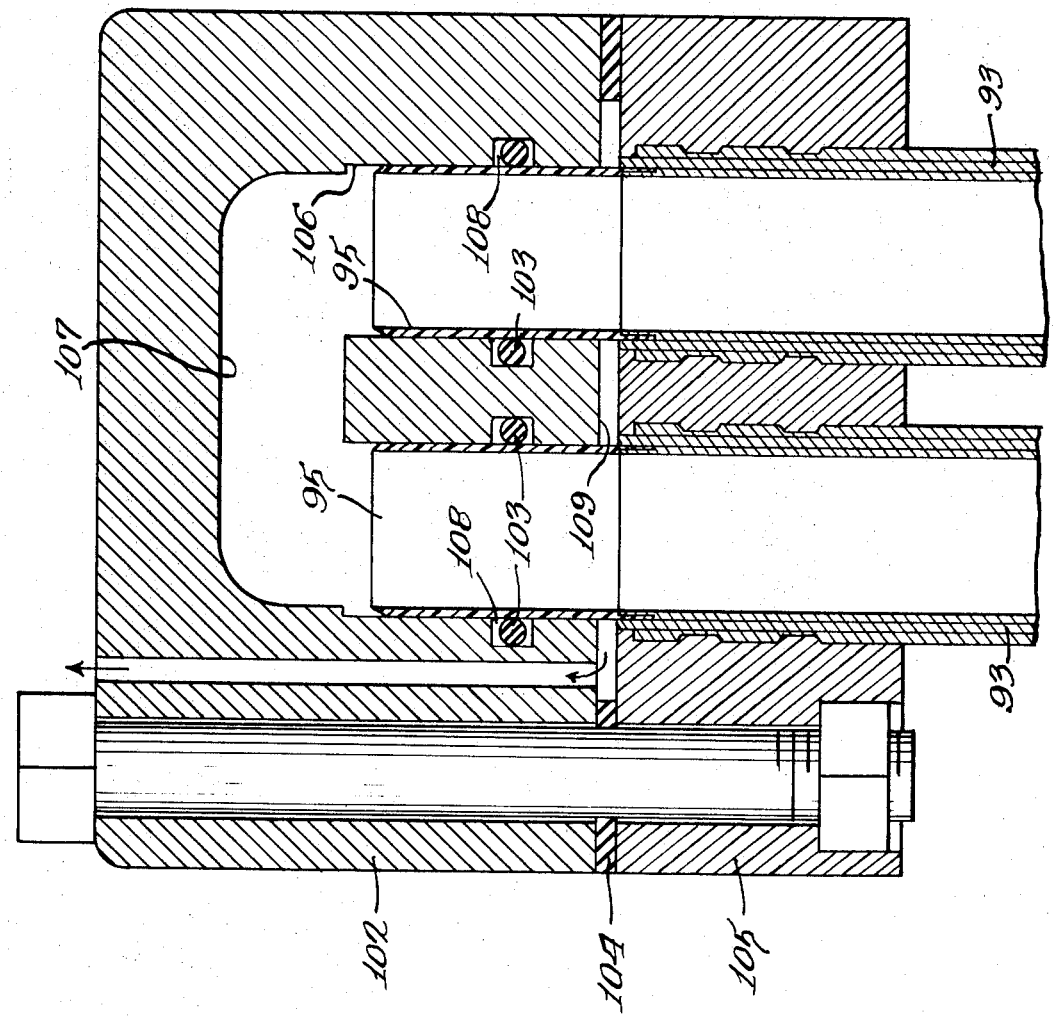

3,581,900

REVERSE OSMOSIS LIQUID PURIFICATION

CROSS-REFERENCE

This application is a continuation-in-part of my copending application Ser. No. 724,663, filed Mar. 20, 1968, now abandoned, which in turn is a continuation-in-part of my application Ser. No. 678,051, filed Oct. 25, 1967, now abandoned.

BACKGROUND OF THE INVENTION

Increasing population and industrial expansion have focused attention on methods of purifying liquids, such as salt or brackish water, for human and industrial uses. Considerable success has already been achieved by flash distillation methods, and by electrodialysis. Both of these methods require energy input in the form of heat or electricity. Reverse osmosis liquid purification requires neither heat nor electricity, but only a pressure differential. There are, therefore, some applications where reverse osmosis offers the most promise as a liquid purification system. There is no phase change of the liquid, and no heat is generated in the process.

In order to purify liquids, such as salt water or brackish water, by reverse osmosis, the salt containing water in contact with a semipermeable membrane must be subjected to pressure in excess of the osmotic pressure of the salt water. For a typical concentration of salt in sea water the osmotic pressure is on the order of 350 p.s.i.g. and accordingly, a pressure differential in excess of that figure must be maintained across the membrane. In this respect, it is not unusual to provide a pressure differential on the order of about 1,000 p.s.i.g. and accordingly, it will be apparent that the membrane requires substantial support in order to resist rupture under such substantial pressures.

Typically the membranes, which are formed of well-known materials, are about 0.004 inch thick and are supported by a strong porous backing which does not readily compress under pressure and close its pores or capillaries so that the potable water may flow therethrough to be collected for use. Because, in practice, the membrane itself may tend to compress after use periods on the order of two to three months, the membranes must be periodically replaced in order that the process may continue at an economical rate.

Currently, much of the equipment for purifying liquids using the reverse osmosis principle utilize tubular membranes which are supported in rigid tubes, and the membranes are formed by either of two methods. In one method, the membrane is cast as an integral part of the supporting tube. In the other method, the membrane is formed in a casting tube, removed, and its central portion is wrapped in a porous cloth. The resulting structure is pulled into a supporting tube and cured in place. The unwrapped ends of the membrane are then flared for sealing purposes.

Replacement of membranes made in accordance with either of the above methods is complicated. In the first-mentioned type, the used membrane must first be dissolved out of the supporting tube, and a new membrane is then cast internally, quenched in cold water and cured in hot water to a very exacting degree. Such operations are extremely involved, controlled processes and do not lend themselves to be performed in the field at the site of a reverse osmosis liquid purification plant. Membrane modules of this type must either be scrapped, or shipped back to the factory for the replacement process, either being a costly procedure.

The cloth wrapped membrane modules can be renovated only by removing the old cloth and membrane structures from the tubes, wrapping new membrane structures in the cloth, pulling them into the support structures and heat curing the resultant structures by a carefully controlled process, not readily adapted to field operations. With either of the above types of membrane modules, the membranes are very fragile, and difficult to handle, and require specially trained personnel and equipment to attempt field replacement.

SUMMARY OF THE INVENTION

This invention provides a new and improved tubular membrane structure for use in reverse osmosis liquid purification equipment. This new membrane structure may be easily inserted and removed from the reverse osmosis equipment by unskilled operators at the reverse osmosis equipment installation without expensive field fabrication, is easily shipped without damage, and the old membrane structures which are replaced can simply be discarded. The porous, semirigid, thin-walled tube is factory lined on its internal surface with a suitable membrane. This inexpensive membrane structure is received within one of the supporting tubes of a tube bundle, and the ends of the tube may be provided with a liquid impervious plastic coating or with plastic end ferrules. The outer surface of the thin-walled tube may be grooved to facilitate flow of product liquid to collecting manifolds. In a modified form, the external surface of the tubular membrane structure is smooth, and the internal surface of the supporting tube is lined with a longitudinally grooved plastic sleeve to provide longitudinal flow channels. In yet another embodiment, the longitudinal grooves may be formed directly in the inner surface of the supporting tube. The supporting tube may be fabricated from aluminum, plastic, or the like, and is bonded to the inner surface of the porous tube.

The supporting tubes are arranged in tube bundles comprising a plurality of generally parallel supporting tubes having their respective ends mounted in manifolded headers which are sealed by complementary end caps. Removal of one end cap provides access to the tubular membrane structure for easy replacement with a fresh, unused membrane structure.

DESCRIPTION OF DRAWINGS

FIG. 1 is a perspective view of the membrane module made according to one embodiment of the invention with parts shown in section;

FIG. 2 is a fragmentary sectional view of a portion of a reverse osmosis liquid purification device including a membrane module made according to one embodiment of the invention;

FIG. 3 is a fragmentary sectional view taken approximately along the line 3—3 of FIG. 2;

FIG. 4 is an enlarged, fragmentary, cross section of a modified membrane module;

FIG. 5 is a rear elevation of the modified membrane module undergoing a forming step during its manufacture;

FIG. 6 is a fragmentary vertical section taken approximately along the line 6—6 of FIG. 5;

FIG. 7 is a perspective, exploded view of the tubular membrane structure made according to another embodiment of the invention;

FIG. 8A is an enlarged fragmentary, section view of an unlined internally grooved support tube;

FIG. 8B is an enlarged fragmentary section view of a lined tube having longitudinal grooves in the lining; and FIG. 9 is a fragmentary sectional view of a portion of a reverse osmosis liquid purification device made according to another embodiment of the invention including a modified tubular membrane structure of FIG. 7.

DESCRIPTION OF THE PREFERRED EMBODIMENTS

An exemplary embodiment of an expendable membrane structure, generally designated 10, made according to the invention is illustrated in FIG. 1 and is seen to comprise an outer, generally cylindrical, semirigid, thin-walled tube 11 having bonded to its interior surface, a tubular film of semipermeable membrane material 12. Preferably, the film 12 is bonded to the tube 11 by conventional casting techniques.

The tube 11 is formed of any suitable porous material such as paper or porous plastic capable of withstanding compression to maintain porosity over a substantial period when subjected to relatively high pressures. While the tube 11 should be made so that it will resist compression, the tube 11 itself is of a nature such that it, alone, is incapable of withstanding the high pressures of reverse osmosis processes and would rupture if subjected to the same.

In one embodiment of the invention, the ends of the tube 11 are dipped in a liquid impervious plastic of any suitable composition so as to provide a liquid impervious coating 14 at the ends prior to the bonding of the film 12 to the tube 11 for sealing purposes. The resulting tube structure will permit potable water diffusing through the tubular film 12 to flow not only radially through the pores of the tube 11, but also in a direction parallel to the longitudinal axis of the tube 11 until such time as it reaches a barrier in the form of the liquid impervious coatings 14.

FIG. 2 illustrates one construction of reverse osmosis equipment in which the expendable membrane structure 10 can be used. This equipment includes a plurality of rigid tubes 16 capable of withstanding the relatively high pressures present in the reverse osmosis liquid purifying equipment. The tubes 16 support the expendable membrane structures 10 along the major portion of their length to prevent bursting.

The ends of the rigid support tubes 16 are received and supported within bores 18 in headers 20 (only one of which is shown). The bores 18 terminate in an annular groove 22 to define a portion of a manifold for conducting potable water diffused through the film 12 to a collection point. The ends of the expendable membrane structures 10 are received within the support tube 16 so that the coating 14, and an adjacent uncoated portion 24 extend from the support tube 16 and outwardly from the annular groove 22 so that the innermost edge of the coating 14 is located outwardly of the outer edge 26 of the header 20. In this arrangement, a liquid to be purified within the membrane structure 10 will diffuse through the film 12 into the porous tube 11 to flow parallel to the longitudinal axis of the membrane structure 10, and there received within the annular groove 22.

Each header 20 is provided with an end cap 26 which may include channels 28 for conducting the raw liquid to be purified into the tubular membrane structures 10 in their respective support tubes 16. The end caps 26 are maintained in place on the headers 20 by means of bolts 32 (only one shown) extending through a bore 34 in the end cap 26 and a complementary bore 36 in the header 20. A nut 38 is threaded upon the bolt 32 to tightly clamp the end cap 28 to the header 20. The interface between the header 20 and the end cap 28 is sealed by a gasket 40, which also cooperates with washers 42 to provide a product channel for the purified liquid.

As seen in FIGS. 2 and 3, the washers 42 may include a flat side 44 embracing the end cap 28 and a grooved side 46 having a plurality of radial grooves 48 separated by lands 50 (FIG. 3). The washers 42 surround the projecting end of the membrane structure 10 adjacent to the interface between the coating 14 and the uncoated portion 16 so that purified liquid received within the annular groove 22 will flow through the grooves 48 into a space 52 between the end cap 28 and the header 20 for subsequent collection.

To insure that undesirable mixing of product liquid and raw liquid between the space 52 and the channel 30 does not take place, the end cap 28 is provided with an annular groove 54 near the open ends of the channel 30 in which an O-ring 56 is received. The O-ring 56 bears against the coating 14 on the end of the membrane structure 10 to provide a seal. As a result, only product liquid is received within the space 52 which has diffused through the membrane film 12 and which has traveled laterally along the porous, thin-walled tube 11 during the reverse osmosis process.

The space 52 may be common to several of the support tubes 16 and their corresponding membrane structures 10 to provide a manifold for collection of the product liquid. In order to deliver the purified liquid received within the space 52 to a point of use, a bore 58 in the end cap 28 is provided which communicates with the space 52. Membrane structures 10 may be easily removed and replaced simply by removing one of the end caps 28 providing access to the inside of the support tube 16 at the field site. The support tubes 16 remain in place and require no further disassembly. The thin-walled, semirigid tube 11 supports the membrane film 12 during transit and greatly facilitates handling as compared to prior art membrane structures.

Product liquid is collected internally, and is less subject to contamination after it has diffused through membrane film 12 as compared to prior art apparatus in which the support tubes 16 are apertured or porous for external collection of product liquid.

The expendable membrane structure of the subject invention can materially reduce the capital costs of a liquid purification plant because product liquid pumps are not required, sufficient pressure being supplied by the closed liquid system. The open product liquid systems of the prior art require auxiliary pumping means to move the product liquid to the point of use.

In the subject invention, the product liquid is collected in the confined spaces 52 and passes under pressure into the bore 58, which can be directly connected to piping for conveying product liquid under pressure to the point of use.

Many materials may be used for fabricating the thin-walled tube 11, the membrane film 12, and the coating 14. For brackish water desalination good results are obtained with a tube 11 comprising a paper in which the cellulose fibers have been coated with a polycarbonate or polystyrene resin. A liquid permeable paper having plastic coated cellulose fibers to provide wet strength can be used to fabricate the tube 11, and it may also comprise plastic fibers oriented in a random fashion and bonded together by conventional lay-up techniques to form a liquid permeable porous structure. The tube 11 may also be formed of insoluble particles that have been bonded or cemented together by thermal, physical or chemical processes. Finally, material which has been rendered porous to permit water to flow through its structure by means of selective solvent action of chemicals or the release of volatile components due to aging in the atmosphere, or the application of heat or a partial or full vacuum treatment may be used.

Preferably, the tube 11 has a wall thickness in the range of 0.025 to 0.050 inch. Similarly, the membrane film 12 may be formed of cellulose acetate by conventional, well-known casting techniques to have a wall thickness on order of 0.004 inch.

In one embodiment of the invention, the coating 14 is formed by simply dipping the ends of the membrane structure 10 into a liquid impervious plastic such as polystyrene, polycarbonate or epoxy resins.

A modified embodiment of a membrane to be made according to the invention is illustrated in FIG. 4 and is seen to comprise a thin-walled, semirigid tube 70 formed of three distinct layers 72, 74 and 76 of a paper whose fibers have been coated with a plastic such as polycarbonate. As in the case of the membrane structure 10, the inner wall of the semirigid tube 70 has a semipermeable membrane 78 bonded thereto by conventional casting techniques. The material of the membrane film 78 may be identical to that used in forming the membrane structure 10.

The outer surface 80 of the semirigid tube 70 is provided with a plurality of grooves 82 which are located at the interface between the tube 70 and the rigid support tube 16 when the tube 70 is in place in the support tube 16. Any desired number of grooves 82 may be provided, limited only by the diameter of the tube 70. For example, for a ½-inch tube diameter, 16 grooves 82 are provided.

The grooves 82 provide increased longitudinal flow of product liquid between the semirigid tube 70 and the support tube 16. In addition, the grooves 82 provide additional composite strength to the tube 70.

The method by which the membrane structure illustrated in FIG. 4 is formed, with the exception of the formation of the grooves 82 is identical to the method by which the membrane structure 10 (FIG. 1) is formed. The manner in which the grooves 82 are formed in the semirigid tube 70 (FIG. 4) can best be understood by reference to FIGS. 5 and 6.

FIGS. 5 and 6 show a circular die 84, which includes a center cavity 86 through which the semirigid tube 70 is drawn. The inner cavity 86 is defined by a generally circular wall 88 which is continuous in nature except for the presence of inwardly extending embossing ridges 90. The number of embossing ridges 90 may be selected to provide the desired number of grooves 82.

At one end of the die 84 the embossing ridges 90 are tapered outwardly as at 92 to terminate in a manner such that the corresponding end of the cavity 86 has a diameter no less than the outer diameter of the semirigid tube 70 to facilitate introduction of the semirigid tube into the cavity 76. Preferably, the same end of the die 84 and the cavity 86 thereof includes relieved portions 92 which may be semicircular in cross section and which taper to the substantially continuous circular portion to facilitate introduction of the tube into the die cavity 86.

To provide the grooves 82 in the semirigid tube 70, the die 84 is first heated, the tube 70 is inserted into the die 84 and is drawn through the cavity 86. The heat applied to the die 84 is transmitted through the embossing ridges 92 to heat and deform the plastic coated paper fibers of the semirigid tube 70. The plastic on the paper fibers softens under the pressure and heat and flows to the walls of the grooves 82 formed by the embossing ridges 90. Cooling fixes the plastic to provide the membrane grooves 82 illustrated in FIG. 4. The grooves 82 are relatively resistant to collapse, even under extended exposure to the typical 1,000 p.s.i.g. pressure of the reverse osmosis process.

In one embodiment, each of the layers 72, 74 and 76 forming the semirigid tube 70 were formed of a 7—9 mil porous paper impregnated with a polycarbonate plastic and grooves as deep as 18 mils in a 27 mil overall tube wall thickness were formed. The die temperature was held in the range between about 400° to 700° F., and tube velocity during the drawing operation was varied to obtain smooth drawing and optimum flow of the softened plastic dependent upon die temperature.

After the grooves 82 are formed, the ends of the tube 70 may be coated with a liquid impervious coating such as the coating 14 to provide liquid tight end seals in apparatus such as that illustrated in FIGS. 2 and 3.

The grooves 82 of the membrane structure 70 permit free longitudinal flow of the product water within the supporting tubes 16 of the reverse osmosis apparatus and, like the membrane structure 10, eliminates the need for costly drilling operations to provide perforations in the supporting tube 16. The grooves 82 also tend to increase the flow of product liquid through the membrane film 12 over that obtainable with the membrane structure 10. Accordingly, some grooved structure is desirable to increase plant efficiency. The grooves 82 also strengthen the membrane structure 70 substantially, thereby decreasing in transit damage.

FIGS. 7—9 illustrate another improved embodiment of the tubular membrane structure of the invention. As shown there, a tubular membrane structure 93, which is similar to the membrane structure 10, includes a porous tube 94 which is provided with liquid impervious end ferrules 95 having frustoconical exterior end surfaces 95a, instead of the liquid impervious coating 14. The end ferrules 95 are bonded to the ends of the porous tube 94 by means of a waterproof adhesive such as a polycarbonate dissolved in a suitable solvent prior to casting a membrane film 96 on the inside surface of the tube 94 and the ferrules 95. If the exterior surface 96a of the tube 94 is to be grooved, as shown in FIGS. 4—6, it is done prior to the addition of the end ferrules 95. However, it is contemplated that grooving of surface 96a can be eliminated entirely, especially when the tubular membrane structure 93 is used in combination with a rigid support tube 97, such as is illustrated in FIGS. 8 and 9.

The support tube 97 is similar in function and design to the support tube 16 previously described, but in addition, it is provided with longitudinal grooves 98 which are either formed integrally along the inner surface 99 of the tube 97, or along the inner surface 100 of a tubular liner 101 fitted inside the support tube 97. In either case, the longitudinal grooves 98 provide a convenient, unobstructed flow path for product liquid.

As presently contemplated, the support tube 97 is formed of plastic, aluminum, or both because of their strength, light weight, and resistance to corrosion. When only a single material is used, grooves 98 may be extruded directly into the internal surface 99 of the tube 97 during manufacture and this fabrication technique is particularly desirable if the tube 97 is formed of solid plastic. However, the same may be done if the tube 97 is formed of aluminum.

When an aluminum support tube 97 is employed, it is desirable to increase corrosion resistance by providing the tube 97 with the tubular liner 101. The liner 101 may be separately extruded with longitudinal grooves 98 along its inner surface 101. The liner 101 is then inserted in the aluminum tube 97 and the composite is permanently bonded together. The bonding of the tube 97 to the liner 101 is presently accomplished by a swaging operation, which reduces the diameter of the tube 97 sufficiently to hold the liner 101 in place. The liner 101 could also be adhesive bonded to the inner surface 99 of the tube 97. In cases where grooves are not required in the liner 101, additional methods of coating the inner surface 99 of the tube 97 are contemplated. For example, a plastic powder could be hot-dusted in the tube 97, or a liquid plastic could be deposited inside. Other protective coatings, such as glass, can be used when grooves 98 are not required.

The liner 101 is preferred at present, because the grooves 98 can be extruded during fabrication of the liner, and the insertion and securing of the liner 101 in the tube 97 is accomplished by a simple mechanical operation, such as by swaging of the tube 97. The grooved liner 101 eliminates the need for grooves 82 on the exterior surface of the tubular membrane structure 93, and thus saves a step in the fabrication of the tube 94.

The modified tubular membrane structure 93, incorporating the end ferrules 95 is well adapted to an improved sealing system shown in FIG. 9. The arrangement shown there is similar to FIG. 2, but with several improvements, the most important being the modified construction of end cap 102 which isolates O-ring seals 103 from gasket seals 104 between header 105 and the end cap 102. As shown in FIG. 9, the individual tubular membrane structure 93 extend further into openings 106 of channel 107. Annular O-ring recesses 108 are provided around the periphery of the respective openings 106, spaced outwardly from inner surface 109 of end cap 102. As can be seen, the O-ring seals 103 are urged tightly against the outer surfaces of the respective end ferrules 95 to provide an effective, isolated seal separating raw liquid from product liquid.

The provision of frustoconical exterior ends 95a on the ferrules 95 permits the membrane structure 93 to be easily inserted into the respective support tube 97. Specifically, the taper of the surfaces 95a tends to cam the O-ring seal 103 into its recess 108 thereby distorting the same. The inherent resiliency of the O-ring seal 103 then insures that sufficient sealing pressure is exerted by the O-ring seal 103 against the ferrule 95 and the end cap 102. As a result, in order to replace a membrane structure, it is only necessary to remove the end cap from one side of the apparatus, remove the membrane structure requiring replacement, insert a new membrane structure, and replace the end cap. No manipulation of sealing means is required during the replacement process.

The modifications shown in FIGS. 7—9 are further improvements of the invention through which even greater economics in fabrication are realized without any loss in serviceability. The plastic lined aluminum support tube obtains all the strength advantages of an inexpensive metal, plus the corrosion resistance of the plastic liner. Since the liner is extruded with integral longitudinal grooves 98 in a single operation, it is possible to eliminate the need for providing grooves in the external surface of the tubular membrane structure.

I claim:

1. As a new article of manufacture, an easily transported, disposable, semipermeable membrane structure adapted for receipt and use in reverse osmosis liquid separation equipment comprising: an elongated, thin-walled tube formed of a material incapable of withstanding pressures on the order of the osmotic pressure of the liquid to be separated and formed to conduct separated liquid to the exterior thereof and further being externally unsupported by rigidifying means along substantially its entire length, and a film of material semipermeable to the liquid to be separated bonded to the internal surface of said tube, the external surface of said thin-walled tube including a plurality of grooves extending the length thereof adapted to conduct liquid longitudinally of said thin-walled tube.

2. In an apparatus for liquid separation by reverse osmosis, the combination comprising: a rigid supporting tube constructed and arranged to withstand high pressure; a semirigid, thin-walled tube formed of a porous material incapable of withstanding high pressure received snugly but removably within said supporting tube; and a semipermeable membrane film bonded to the interior wall of said thin-walled tube, whereby said supporting tube serves to support said film during a reverse osmosis process to prevent rupture of the membrane in the thin-walled tube due to high pressure, said thin-walled tube providing support means for the membrane film in transit and when the membrane film is introduced into or removed from said supporting tube.

3. In an apparatus for liquid separation by reverse osmosis, the combination comprising: a rigid supporting tube constructed and arranged to withstand high pressure; a semirigid, thin-walled tube formed of a porous material received snugly but removably within said supporting tube; a semipermeable membrane film mounted to the interior wall of said thin-walled tube, whereby said supporting tube serves to support said film during a reverse osmosis process to prevent rupture of the membrane and thin-walled tube due to high pressures, said thin-walled tube providing support means for the membrane film in transit and when the membrane film is introduced into or removed from said supporting tube; and a plurality of longitudinal grooves between the inner surface of the supporting tube and the outer surface of the thin-walled tube to facilitate collection of product liquid from the reverse osmosis process.

4. The combination of claim 3, in which the longitudinal grooves are provided in the internal surface of the supporting tube.

5. The combination of claim 4, in which the supporting tube contains an internal liner having longitudinal grooves extending along the internal surface thereof.

6. In an apparatus for removing dissolved material from a liquid by reverse osmosis, the combination comprising: a supporting tube; a unitary tubular structure disposed within said support tube, said tubular structure comprising an outer, relatively thin, porous tube and an inner semipermeable membrane film, said tubular structure having a portion extending from an end of the support tube; first means for conveying liquid to be processed to the interior of said tubular structure; and second means in fluid communication with said portion for conveying processed liquid permeating said membrane film and flowing along the tubular structure between the membrane film and the support tube to a collection manifold.

7. The apparatus of claim 6 in which the support tube is imperforate.

8. The apparatus of claim 6, in which the support tube is aluminum internally lined with longitudinally grooved plastic.

9. The apparatus of claim 6, including supporting means for the support tube end and surrounding the same, and in which said second conveying means comprises a channel in said supporting means adjacent said support tube end.

10. The apparatus of claim 9 in which the supporting means for the support tube comprises a header supporting and surrounding a plurality of said support tube ends, each containing a unitary tubular structure, and including a plurality of said channels, one for each support tube end, said channels being defined by an annular cavity in said header adjacent the respective support tube end.

11. The apparatus of claim 6 in which the interface between the support tube and the tubular membrane structure includes at least one longitudinally extending groove to facilitate flow of product liquid to the collection manifold.

12. The apparatus of claim 11 wherein said groove is formed in the outer surface of said outer tube.

13. A method of making a disposable tubular membrane structure for reverse osmosis comprising the steps of: forming an elongated thin-walled tube having an internal surface and an external surface from a porous, semirigid material, said material when in the form of a tube having sufficient rigidity to support a membrane film during transit of the structure but being incapable of withstanding high pressures customarily encountered in reverse osmosis processes; and permanently bonding a selectively permeable membrane film to said internal surface.

14. The method of claim 13, including the step of providing a liquid impervious means surrounding the ends of the thin-walled tube.

15. A method of making a disposable tubular membrane structure for reverse osmosis comprising the steps of: forming an elongated thin-walled tube having an internal surface and an external surface from a porous, semirigid material; permanently bonding a selectively permeable membrane film to said internal surface; and forming a plurality of longitudinal grooves in the external surface of the thin-walled tube.

16. The method of claim 15 in which the thin-walled tube is a plastic coated paper and the longitudinal grooves are formed with a die having an internal cavity with a plurality of embossing ridges, by first heating the die to a temperature in the range of about 400°—700° F., and then drawing the thin-walled tube through the internal cavity of the die.

17. As a new article of manufacture, as easily transported, disposable semipermeable membrane structure adapted for receipt and use in reverse osmosis liquid mixture separation equipment comprising: an elongated, thin-walled tube formed of a semirigid material capable of supporting a membrane film during transit of the article and incapable of withstanding pressures on the order of the osmotic pressure of the liquid mixture to the processed and formed to conduct separated liquid to the exterior thereof and further being externally unsupported by rigidifying means along substantially its entire length and a film of materials semipermeable to the liquid to be separated bonded to the internal surface of said tube.

18. As a new article of manufacture, an easily transported, disposable semipermeable membrane structure adapted for receipt and use in rigid support tubes of reverse osmosis liquid separation equipment consisting essentially of an elongated thin-walled tube formed of paper and incapable of withstanding pressures on the order of the osmotic pressure of the liquid to be processed and formed to conduct processed liquid to the exterior thereof and a film of material semipermeable to the liquid to be processed bonded to the internal surface of said tube.

19. The article of claim 18 in which the membrane film covers the entire internal surface of said tube.

20. The article of claim 18 in which the ends of said thin-walled tube terminate in a liquid impervious material.

21. A method of making a semipermeable membrane structure comprising the steps of:
   a. forming an elongated tube having an internal surface and an external surface from a porous, semirigid material;
   b. applying a film of a material semipermeable to impure water to said internal surface; and
   c. forming a plurality of grooves in said external surface along the length thereof.

22. The method of claim 21 further including the step of applying liquid impervious means to the ends of the tube.

23. The method of claim 21 wherein the material from which the tube is formed is a plastic coated paper and step (c) further comprises:
   c-1. providing a die having an internal cavity with a plurality of embossing ridges,
   c-2. heating the die to a temperature in the range of about 400°—700° F., and
   c-3. drawing the tube through the internal cavity of the die.

24. In an apparatus for removing a liquid from a liquid mixture by reverse osmosis, the combination comprising: an imperforate support tube; a unitary tubular structure disposed within said support tube, said tubular structure comprising an outer, relatively thin, porous tube having a portion from which purified liquid may be received and an inner semipermeable membrane film; first means for conveying the liquid mixture to be processed to the interior of said tubular structure; and second means in fluid communication with said portion for conveying processed liquid permeating said membrane film and flowing along the tubular structure between the membrane film and the support tube to said portion to a collection manifold.

25. In an apparatus for liquid separation by reverse osmosis, the combination comprising: a rigid, imperforate supporting tube constructed and arranged to withstand high pressure; a semirigid, thin-walled tube formed of a porous material received snugly but removably within said supporting tube; and a semipermeable membrane film bonded to the interior wall of said thin-walled tube whereby said supporting tube serves to support said film during a reverse osmosis process to prevent rupture of the membrane and thin-walled tube due to high pressures, said thin-walled tube providing support means for the membrane film in transit and when the membrane film is introduced into or removed from said supporting tube.

26. A method of making a disposable tubular membrane structure for reverse osmosis comprising the steps of: forming an elongated thin-walled tube having an internal surface and an external surface from porous, semirigid paper; and permanently bonding a selectively permeable film to said internal surface.

27. A membrane structure for use in separating the constituents of a liquid mixture comprising a layer of fibrous, organic material having its fibers coated with polycarbonate to impart wet strength thereto and a membrane supported on said layer.

28. A membrane structure for use in liquid separation operations performed under the conditions of reverse osmosis comprising a semipermeable membrane supported on a semirigid paper tube, the paper of said tube having fibers coated with polycarbonate to impart wet strength thereto.